United States Patent
Braun

(10) Patent No.: US 6,568,738 B1
(45) Date of Patent: May 27, 2003

(54) OPTICAL GLARE LIMITER

(76) Inventor: Uwe Peter Braun, Muehlenweg 8d, Lenzen (Elbe) (DE), 19309

( * ) Notice: Subject to any disclaimer, the term of this patent is extended or adjusted under 35 U.S.C. 154(b) by 0 days.

(21) Appl. No.: 10/049,118

(22) PCT Filed: Aug. 25, 2000

(86) PCT No.: PCT/DE00/02983
§ 371 (c)(1),
(2), (4) Date: Feb. 8, 2002

(87) PCT Pub. No.: WO01/14168
PCT Pub. Date: Mar. 1, 2001

(30) Foreign Application Priority Data

Aug. 25, 1999 (DE) .......................... 199 41 125

(51) Int. Cl.⁷ ................................. B60J 3/00
(52) U.S. Cl. ................... 296/97.2; 296/97.8; 296/97.6; 359/601
(58) Field of Search .............. 296/97.2, 97.8, 296/97.6, 97.5, 97.1, 97.7; 362/259, 364, 309; 359/603, 601, 630, 604, 13, 614, 606; 351/44, 49, 45, 47, 246, 243; 340/469, 472; 307/10.8

(56) References Cited

U.S. PATENT DOCUMENTS

| 4,427,264 A | * | 1/1984 | Kamerling | .................. 359/601 |
| 4,787,735 A | | 11/1988 | Jolson | |
| 4,874,195 A | * | 10/1989 | Lu et al. | ..................... 296/97.2 |
| 4,905,125 A | | 2/1990 | Stefan et al. | |
| 4,986,592 A | * | 1/1991 | Kaiser et al. | ............... 296/97.8 |
| 5,249,835 A | * | 10/1993 | Emoto | ........................ 296/97.8 |
| 5,258,607 A | * | 11/1993 | Agostini et al. | ............ 359/230 |
| 5,305,012 A | * | 4/1994 | Faris | ........................... 359/604 |
| 5,356,192 A | * | 10/1994 | Schierau | ..................... 296/97.8 |
| 5,613,725 A | * | 3/1997 | Lozano | ....................... 296/97.6 |
| 5,714,751 A | * | 2/1998 | Chen | .......................... 359/601 |
| 6,056,424 A | * | 5/2000 | DiNunzio | ................... 362/490 |
| 6,079,854 A | * | 6/2000 | Ra | .............................. 362/342 |

FOREIGN PATENT DOCUMENTS

| DE | 3048424 | | 7/1982 |
| DE | 4218436 | | 12/1993 |
| JP | 55 148617 | * | 11/1980 |
| JP | 62 273117 | * | 11/1987 |
| WO | 9967106 | | 12/1999 |
| WO | WO 01/14168 | * | 3/2001 |

* cited by examiner

Primary Examiner—Kiran Patel
(74) Attorney, Agent, or Firm—Jordan and Hamburg LLP

(57) ABSTRACT

An optical glare limiter uses an electrical power source, typically of a motor vehicle. It includes a light sensor component and a light source. The light from the glare limiter light source falling on a reflecting surface depends on the intensity of the light falling on the light sensor component from an external blinding source and can be regulated electronically so that the light in the driver's field of vision has a contrast that is almost homogeneous and widespread with the effect of reducing the blinding effect.

15 Claims, 4 Drawing Sheets

OPTICAL GLARE LIMITER

Figure 1:
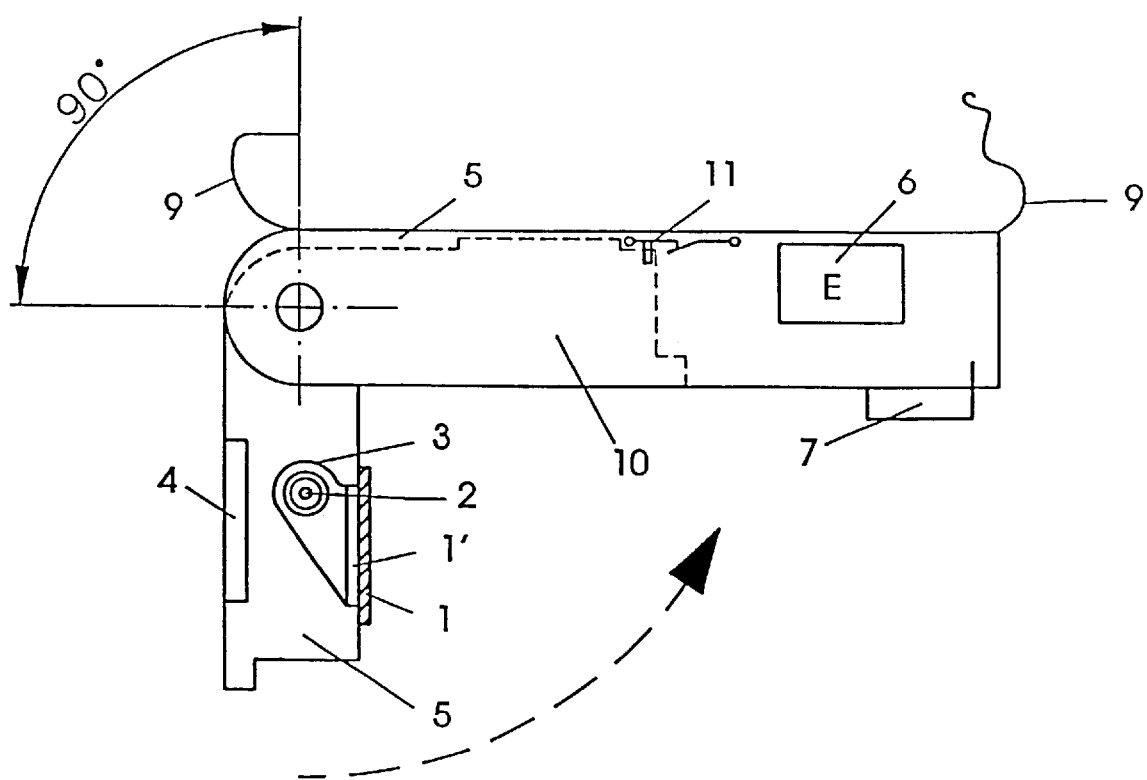

The invention is an optical glare limiter, as used in vehicles in particular.

It is well known that the ability of the human eye to register and perceive contrast, color and forms of the exterior world more or less quickly depends, besides the adaptability of the eye, essentially on the brightness of the light hitting the eye and the differences in the brightness of the field of vision. If the brightness in the field of vision is too high the eye's performance may be significantly impaired. Such an impairment of the basic function of the eye is described as blinding.

It is also well-known that in night traffic quite a number of accidents can be attributable to mistakes or false reactions of the driver due to blinding of the human eye. When driving at night the cilia muscles of the eye are more or less relaxed, depending on the focal point of the object being observed. The pupil is relatively wide open and the eye adjusted to the average brightness of the field of vision. If, for instance, the average brightness changes with the light of an oncoming vehicle, the adjustment from one state to another requires a certain period of time, which depends on the previous lighting of the eye, the direction of the adjustment and the difference in brightness before and after adjustment. The larger the difference of the brightness from the oncoming vehicle before the adjustment, the more the retina is irritated, increasing the demands on the speed of the light and dark adjustment and leading to a veil in the retina through the scattered light inside the eye and then to reduced vision. The consequences are, amongst others, that oncoming traffic is only recognized to late or is not sharply focused and distances are improperly estimated and inappropriate reactions by the driver are initiated.

The increasing percentage of xenon-based headlights is increasing the danger of the damaging influences of the increased power of this type of headlight even more compared to the conventional halogen headlight. Investigations have shown that test persons of every age group are disturbed by the xenon headlights in general and independent of the measurable impairment of vision. In particular elderly persons may no longer be able to determine contrasts when looking into xenon lights. (Der Spiegel, 7/1998, pg. 168 ff).

From DE 42 18 436 A1 it is now known that there is a lighting element for vehicles that reduces the blinding effect of oncoming traffic at night. The lighting element is installed in the interior of the vehicle in the area of the driver so that a light source is attached outside the drivers field of vision in a way that a part of the light is directed at the driver's face, whereby the light source is linked to the headlights of the vehicle in such a manner that the light source shines when the car lights are turned on. With the aid of sensors the light source is turned on when light comes from oncoming traffic.

The apparent technical solution with DE 42 18 436 A1 has the definite technical disadvantage that it is not able to accomplish the task. A portion of the light from the light source of the lighting element is directed at driver's field of vision and causes a dangerous blinding effect itself.

The invention has therefore set itself the goal of creating an improved glare limiter, which reduces the blinding effect of external light sources, especially with optical means.

The invention solves the task with an optical glare limiter with the properties of the claim 1. The advantages of the design of the glare limiter invention are found in the characteristics secondary claims 2 to 8.

The invented optical glare limiter has the advantage that is effectively reduces the blinding effect of external light sources in a quite simple manner. It is therefore especially well-suited for use in vehicles. The invented glare limiter protects the driver from the dangerous blinding effect of a point of light as described in the state of the art technology and guarantees almost homogenous and widespread contrast conditions free of blinding within the driver's field of vision.

When used in night driving the brightness differences in the field of vision resulting from oncoming vehicles are significantly reduced and the blinding effect almost completely compensated. The road is clearly seen and the driver is in the position to properly take in the traffic situation.

The blinding effect of oncoming traffic is generally to be found with a distance between the vehicles starting at about 75 m. Below that distance the driver of the effected vehicle is driving almost blind, as a result of the blinding effect. With the optical glare limiter the environment in the area of the driver's field of vision is illuminated in advance when a vehicle approaches so that the eye adjusts to the higher light intensity in time and the blinding effect of the oncoming vehicle is only slight in the blinding range of 75 m. The early environmental illumination of the driver's field of vision allows the brightness differences of the light from oncoming, and otherwise, blinding headlights to only have a limited effect on the human eye. Neither blinding nor glare from the windshield can lead to hazardous effects on the eye's performance. The demands on the adaptability of the human eye are significantly reduced. This is particularly important for elderly drivers due to the fact that the time needed for adaptation to light and dark with changing optical perceptions takes longer. Positive effects are also to be found for nervous drivers.

The reduction of the of the brightness differences in the field of vision also has the advantage that the eye and the driver do not tire as quickly, with the resulting positive emotional effect on the mood and the driver's performance. A preferred form of execution of the invented glare limiter assures a basic lightness keeping the pupil as a level of brightness as with a homogenous lighting close to that of the waking state during the day, so that the pupil is not subjected to a radical change even with otherwise varying brightness from oncoming vehicles.

In the following the optic glare limiter will be explained in detail by means of drawings.

Figure 2:
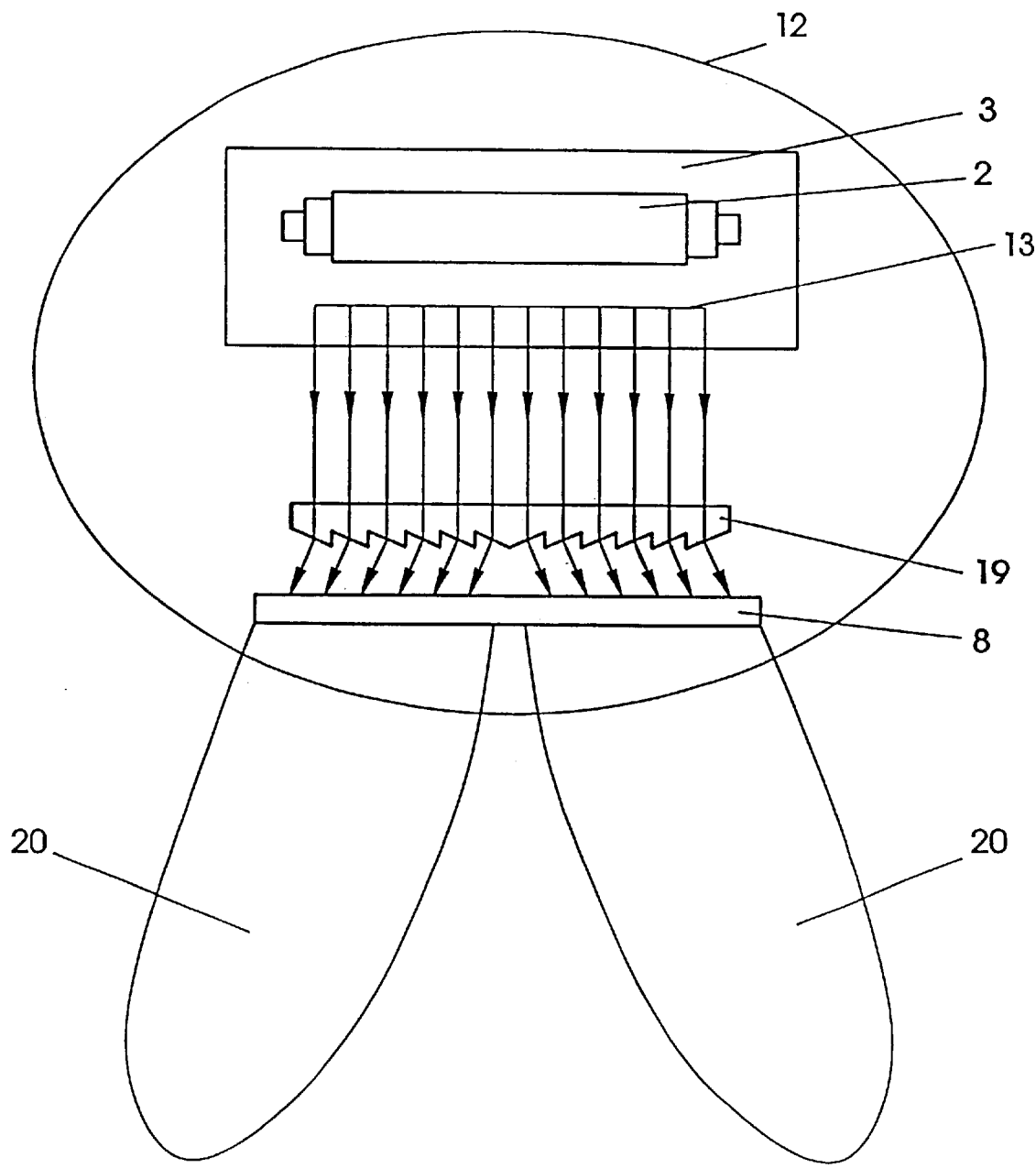
Figure 3:
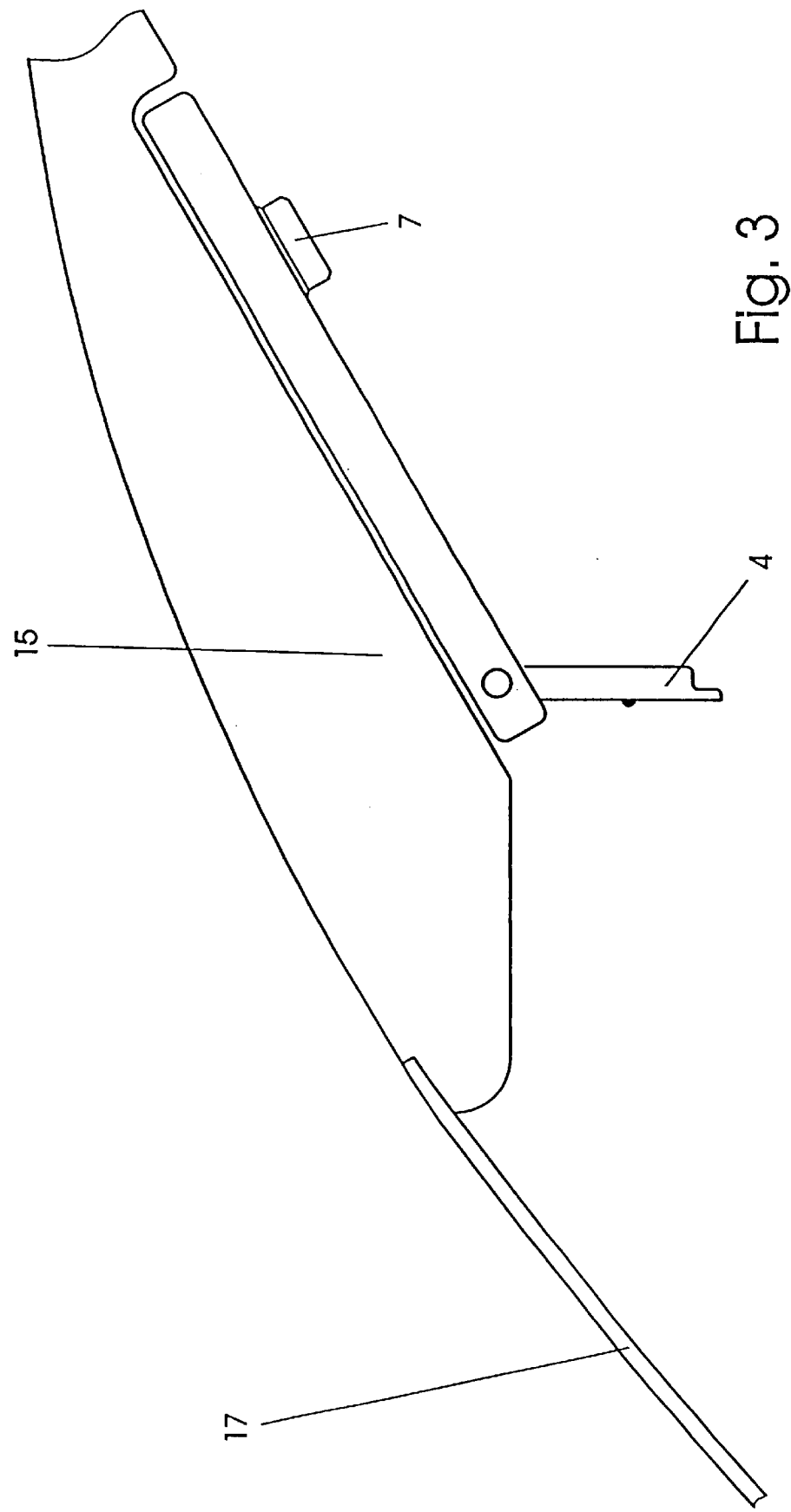
Figure 4:
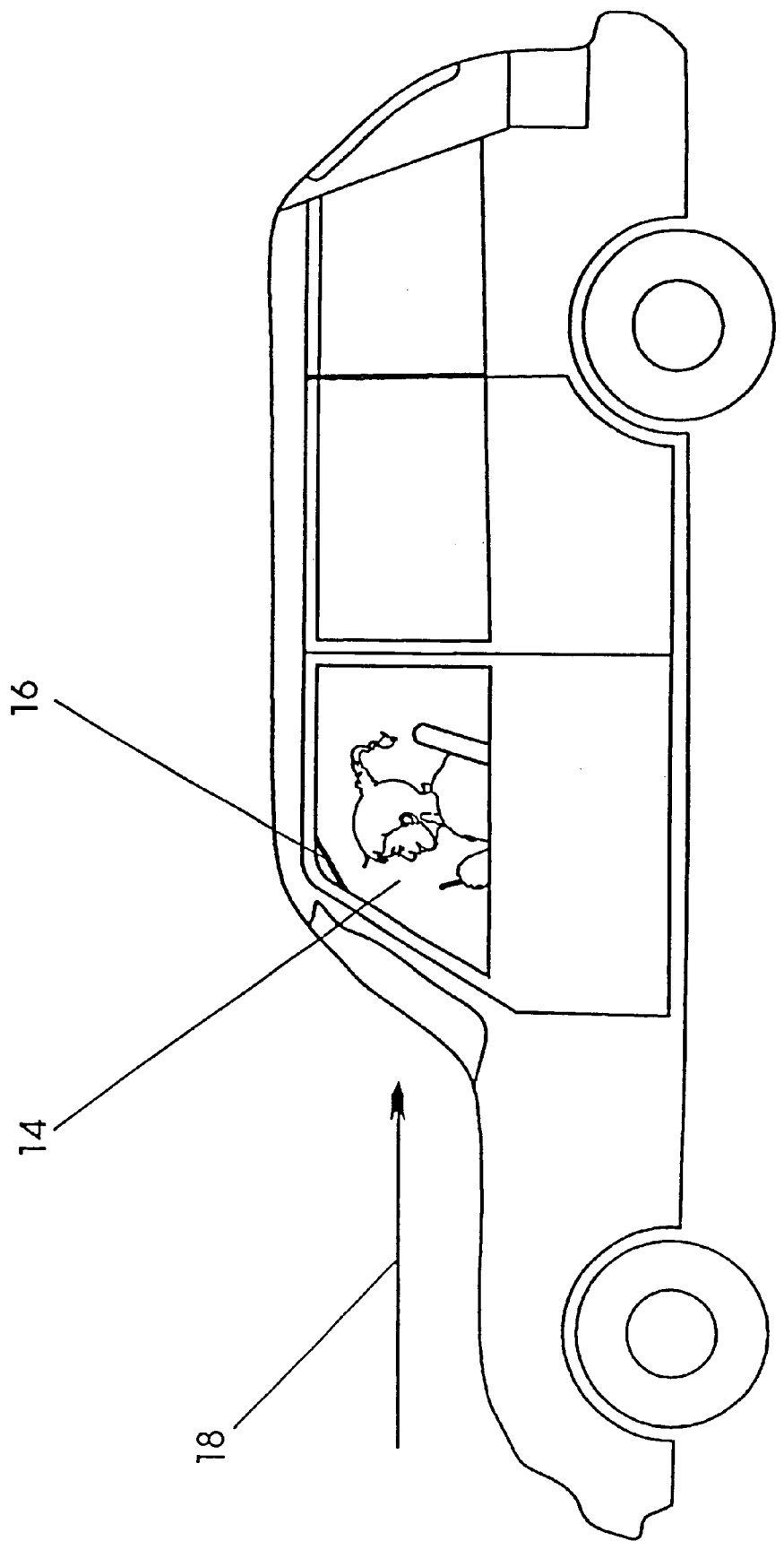

FIG. 1 Side view of an optical glare limiter folded out of the sun visor of a vehicle FIG. 2 Top view of a construction for an optical glare limiter with split radiation characteristics FIG. 3 Side view of an optical glare limiter attached to the inside of the vehicle's roof FIG. 4 Side view of a car with an optical glare limiter installed FIG. 1 shows an optical glare limiter in operating condition, folded out of a vehicles sun visor 9, consisting of a light sensor 4 in a housing 5 and a reflector with a prism 1' and a diffuser 1 in front of the prism 1' in the housing, whereby the reflecting surface is not shown here. The reflector 3 is shown as an asymmetric reflector here. Number 6 shows the electronic control and 7 the 4-step switch for operating the glare limiter, the off switch indicated with 11. The housing 5 is folded out of the recess 10 for the resting state by pressing the switch 11 in FIG. 1 The light sensor 4 is a photodiode. Phototransistors, photoreceptors, light/frequency transducers, light/current transducers, fluorescence collectors or solar cell strips are also suitable. The prism 1' is shaped as a longitudinal prism with counter-rotating prisms mounted in sawtooth form—not shown here. Other prisms, for instance Fresnell prisms, may be used: The light source 2 is a conventional wedge-base bulb Osram 2723/12 V, 2.3 Watt. It is also possible to use light diodes such as aluminum-indium-gallium-phosphate light diodes with 6500 mcd type Alln Gap-LED. A normal opal disk is used as the diffuser 1; the disk absorbs up to 80% of the light 13 from the light source, preferably 30%. The electrical supply is from the vehicle.

FIG. 2 shows the top view of the construction of an optical glare limiter with split radiation characteristics. The prism 1' is shaped as a longitudinal prism with counter-rotating prisms mounted in sawtooth form, in front of which is the diffuser 8. Through the longitudinal prism 19 with counter-rotating prisms mounted in sawtooth form the light 13 from the light source 2 is diffracted into two streams of light 20 with the same brightness which are aimed at the reflecting surfaces that are not shown here. The reflecting surface may, however, be mounted so that the light 13 from the light source 2 first hits this reflecting surface and then passes through the prism 19 and the diffuser 8 in two streams of light 20 which illuminated the field of vision 12, 14 with homogenous contrasts over a broad area and equally and therefore cause a reduced blinding effect.

FIG. 3 shows an optical glare limiter mounted on the inside roof of a vehicle with the light sensor 4 in operation. By means of the switch several steps can be selected. Independent of the stand-by status a basic brightness of the light source 2 of 30% can be generated by selecting another step. Furthermore, it is possible to manually adjust the basic brightness of the light source 2 in the field of vision 12, 14 according to the individual optical perception in the range of 0 to 100%. As soon as the light causing the blindness from oncoming traffic hits the light sensor 4 the light source 2 of the glare limiter becomes lighter or darker depending on the brightness of the light and therefore reduces the difference in the brightness of the external source 18 and the average brightness in the field of vision of the driver.

The Area surrounding the field of vision 12, 14 can be adjusted not only to the individual vision, but it is also guaranteed that neither is there an irritation of the retina from the headlights of oncoming traffic nor a disturbing glare, for instance through reflections on the windshield, which limit the perception or vision of the human eye, to a reasonable degree. The illuminated area of the field of view 12 makes the direct difference in brightness of the headlights from oncoming traffic almost disappear.

FIG. 4 shows the side view of a car with an optical glare limiter 16 installed. So as to not cause blindings by the optical glare limiter similar to those of the car interior lights, the proper positioning within the interior of the vehicle is especially important due to the different sizes of the drivers. To accomplish this the glare limiter is set in the locked position 10 by means of a slight movement from the 90° operating position and manually adjusted so that the light from light source 2 illuminates the field of vision 14 of the driver equally and over a large area.

Naturally it is possible to select other mounting positions and designs of the optical glare limiter than those in the figures as well as its components, depending on the type of vehicle, if these fulfill the desired purpose. It is possible for instance, to equip the sun visor or a part of it with a reflecting surface.

What is claimed is:

1. An optical glare limiter adapted to be powered by an electrical power source and to be used together with a reflecting surface to mitigate blinding glare caused by light from an external source impinging upon a field of vision of a person whose vision is to be protected from blinding glare, the optical glare limiter comprising a light source, a reflector and a prism each overlying a respective portion of the light source, and means for regulating intensity of light emanating from the glare limiter light source in dependence on intensity of the light from the external source, said regulating means comprising a light sensor, and wherein light emanating from the glare limiter light source is so directed as to strike the reflecting surface and then illuminate said field of vision of said person.

2. The optical glare limiter of claim 1, further comprising a diffuser overlying a side of the prism remote from the light source.

3. The optical glare limiter of claim 1, wherein the reflector is asymmetrically shaped.

4. The optical glare limiter of claim 2, wherein the reflector is asymmetrically shaped.

5. The optical glare limiter of claim 2, 3 or 4, wherein the diffuser is comprised of opal and absorbs about 20 to 80% of the light from the light source.

6. The optical glare limiter of claim 5, wherein the diffuser absorbs about 30% of the light from the light source.

7. The optical glare limiter of claim 1, 2, 3 or 4, wherein the prism is a longitudinal prism comprised of counter-rotating prisms which diffract the light from the light source into two light streams.

8. The optical glare limiter of claim 7, wherein the longitudinal prism is of sawtooth form.

9. The optical glare limiter of claim 8, wherein the two light streams are of equal brightness.

10. The optical glare limiter of claim 1, wherein the light sensor produces an electrical output the magnitude of which depends on the intensity of the light from the external source.

11. The optical glare limiter of claim 10, wherein the light sensor comprises a photodiode, phototransistor, photoreceptor, light/frequency transducer, light/current transducer, fluorescence collector or solar cell strip.

12. The optical glare limiter of claim 1, wherein the person is operating a motor vehicle and the glare limiter is installed in the motor vehicle.

13. The optical glare limiter of claim 12, wherein the glare limiter light source comprises a light diode.

14. The optional glare limiter of claim 13, wherein the light diode is an aluminum-indium-gallium-phosphate light diode.

15. The optical glare limiter of claim 12, wherein the motor vehicle has a windshield sun visor for the motor vehicle operator and the glare limiter is installed in said sun visor.

\* \* \* \* \*